US008442466B2

(12) United States Patent
Trikha et al.

(10) Patent No.: US 8,442,466 B2
(45) Date of Patent: May 14, 2013

(54) FM TRANSMITTER WITH A DELTA-SIGMA MODULATOR AND A PHASE-LOCKED LOOP

(75) Inventors: Pushp Trikha, San Diego, CA (US); Tzu-wang Pan, Saratoga, CA (US); Eugene Yang, San Diego, CA (US); Yi Zeng, Fremont, CA (US); I-Hsiang Lin, Mountain View, CA (US); Tg Vishwanath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 881 days.

(21) Appl. No.: 12/492,407

(22) Filed: Jun. 26, 2009

(65) Prior Publication Data

US 2010/0330941 A1 Dec. 30, 2010

(51) Int. Cl.
*H04B 1/06* (2006.01)
*H04B 7/00* (2006.01)

(52) U.S. Cl.
USPC ..................... 455/260; 455/180.3; 455/240.1; 455/323; 455/334; 375/345

(58) Field of Classification Search .... 455/179.1–180.3, 455/230, 232.1, 234.1, 240.1, 255–60, 313, 455/323, 333, 334; 375/345, 376
See application file for complete search history.

(56) References Cited

U.S. PATENT DOCUMENTS 5,862,235 A * 1/1999 Kowalczyk ..................... 381/79
7,120,396 B2 * 10/2006 Wilson .......................... 455/108
7,398,071 B2 * 7/2008 Jensen .......................... 455/260
7,647,026 B2 * 1/2010 Darabi ........................ 455/67.13
7,944,265 B2 * 5/2011 Lam et al. ..................... 327/291
2003/0185418 A1 10/2003 Linnartz et al.
2007/0230616 A1 10/2007 Zolfaghari et al.
2009/0102564 A1 4/2009 Ballantyne

FOREIGN PATENT DOCUMENTS

WO WO2005055623 6/2005

OTHER PUBLICATIONS

International Search Report—PCT/US2010/040247—International Search Authority, European Patent Office, Aug. 31, 2010.
Written Opinion—PCT/US2010/040247—ISA/EPO—Aug. 31, 2010.

* cited by examiner

*Primary Examiner* — Nhan Le
(74) *Attorney, Agent, or Firm* — Kevin T. Cheatham

(57) ABSTRACT

A frequency modulation (FM) transmitter implemented with a delta-sigma modulator and a phase-locked loop (PLL) is described. The delta-sigma modulator receives a modulating signal (e.g., an FM stereo multiplex (MPX) signal) and provides a modulator output signal. The PLL performs frequency modulation based on the modulator output signal and provides an FM signal. The FM transmitter may further include a gain/phase compensation unit and a scaling unit. The compensation unit may compensate the modulating signal for the closed-loop response of the PLL. The scaling unit may scale the amplitude of the modulating signal based on a gain to obtain a target frequency deviation for the FM signal. The PLL may operate in a transmit mode or a receive mode, may perform frequency modulation in the transmit mode, and may provide a local oscillator (LO) signal at a fixed frequency in the receive mode.

36 Claims, 7 Drawing Sheets

FM TRANSMITTER WITH A DELTA-SIGMA MODULATOR AND A PHASE-LOCKED LOOP

BACKGROUND

I. Field

The present disclosure relates generally to electronics, and more specifically to a frequency modulation (FM) transmitter.

II. Background

An FM transmitter is a circuit that modulates the frequency of a carrier signal with a modulating signal and provides an FM signal carrying information in the frequency of the signal. An FM transmitter may be implemented in various electronics devices such as a wireless communication device. It is desirable to implement an FM transmitter as efficiently as possible in terms of cost, circuit area, power consumption, etc. This may be especially true for a wireless device that may include other transmitters and/or receivers for other radio technologies.

SUMMARY

An FM transmitter with good performance and certain advantages in implementation is described herein. In an exemplary design, the FM transmitter comprises a delta-sigma modulator and a phase-locked loop (PLL). The delta-sigma modulator may receive a modulating signal and provide a modulator output signal. The modulating signal may comprise an FM stereo multiplex (MPX) signal having a left plus right (L+R) audio component and a left minus right (L−R) audio component. The PLL may perform frequency modulation based on the modulator output signal and provide an FM signal.

The FM transmitter may further comprise a gain/phase compensation unit that can compensate the modulating signal for the closed-loop response of the PLL. The FM transmitter may further comprise a divider and a scaling unit. The divider may divide the FM signal in frequency based on a fixed divider ratio K and provide an output FM signal. The divider may allow the PLL to operate at a higher frequency, which may provide certain advantages described below. The scaling unit may scale the amplitude of the modulating signal based on a gain to obtain a target frequency deviation for the FM signal. The divider ratio K may be determined based on a selected FM channel for the FM signal, and the gain may be determined based on the divider ratio K.

In one exemplary design, the PLL may be operable in either a transmit mode or a receive mode. The PLL may perform frequency modulation based on the modulator output signal and may provide the FM signal in the transmit mode. The PLL may provide a local oscillator (LO) signal at a fixed frequency in the receive mode. In one exemplary design, the PLL may comprise at least one component having different programmable values for the transmit mode and the receive mode. For example, the PLL may comprise a programmable current for a charge pump, a programmable capacitor for a loop filter, a programmable resistor for the loop filter, a programmable voltage-controlled oscillator (VCO) gain for a VCO, and/or other programmable components.

Various aspects and features of the disclosure are described in further detail below.

DETAILED DESCRIPTION

The word "exemplary" is used herein to mean "serving as an example, instance, or illustration." Any design described herein as "exemplary" is not necessarily to be construed as preferred or advantageous over other designs.

Figure 1:
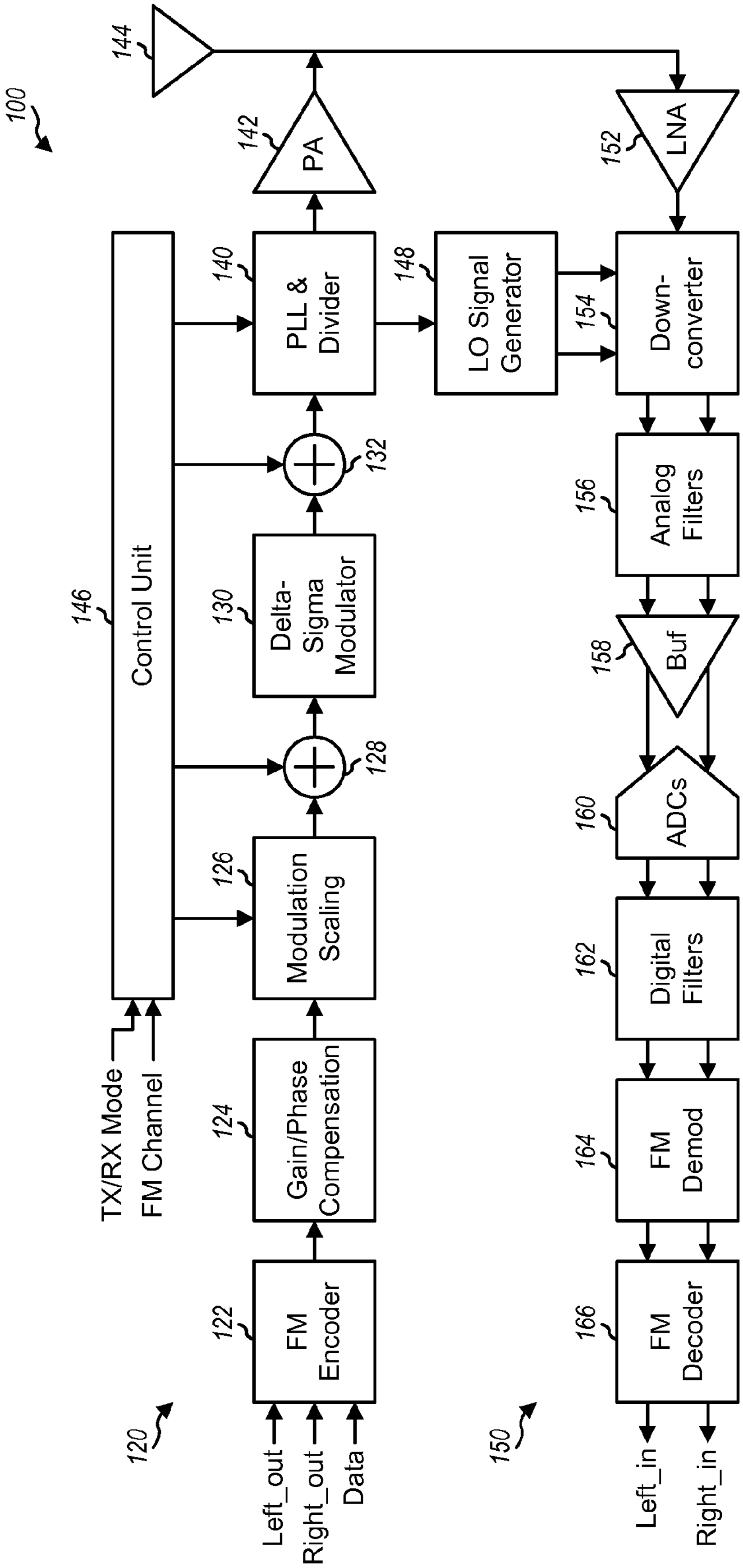
FIG. 1 shows a wireless device with an FM transmitter and an FM receiver.

FIG. 1 shows a block diagram of an exemplary design of a wireless device 100. For simplicity, only an FM transmitter 120 and an FM receiver 150 are shown in FIG. 1. Wireless device 100 may also include one or more transmitters and/or one or more receivers for radio technologies supporting two-way communication such as Code Division Multiple Access (CDMA), Orthogonal Frequency Division Multiple Access (OFDMA), Global System for Mobile Communications (GSM), etc. Wireless device 100 may also include one or more receivers for radio technologies supporting one-way communication such as Global Positioning System (GPS), digital broadcast, etc.

Within FM transmitter 120, an FM encoder 122 receives data for a left audio channel (Left_out), data for a right audio channel (Right_out), and Radio Data System (RDS) data for a data channel. The left and right audio channels may carry stereo audio, and the data channel may carry data (e.g., text) to be sent with the stereo audio. FM encoder 122 encodes the data for the three channels and provides an FM stereo multiplex (MPX) signal. The FM MPX signal includes a left plus right (L+R) audio component from DC to 15 kilohertz (KHz), a left minus right (L−R) audio component from 23 KHz to 53 KHz, and a data component at 57 KHz.

A gain/phase compensation unit 124 receives the FM MPX signal, performs gain and/or phase compensation to account for gain and/or phase distortion by a subsequent PLL, and provides a compensated FM MPX signal. The gain/phase compensation may also be referred to as pre-distortion. A modulation scaling unit 126 scales the compensated FM MPX signal to obtain the target frequency deviation and provides a scaled FM MPX signal. A summer 128 sums the scaled FM MPX signal with a factional value for a selected FM channel and provides a modulator input signal. A delta-sigma (ΔΣ) modulator 130 receives the modulator input signal having multiple bits of resolution at a relatively low input rate and generates a modulator output signal having the same resolution but using one or few bits at a high output rate. A summer 132 sums the modulator output signal with an integer value for the selected FM channel and provides a frequency control signal. The factional value and the integer value for the selected FM channel may be determined as described below.

A PLL and divider 140 modulate the frequency of an oscillator signal based on the frequency control signal from ΔΣ modulator 130, as described below, and provide an output FM signal. A power amplifier (PA) 142 amplifies the output FM signal to obtain the desired output signal level and provides a transmit FM signal, which is transmitted via an antenna 144. Power amplifier 142 may comprise a driver amplifier, an output amplifier, etc.

A control unit 146 receives information indicating the selected FM channel on which to transmit the output FM signal. Control unit 146 provides a gain G to modulation scaling unit 126 to obtain the proper amplitude scaling of the FM MPX signal for the selected FM channel, as described below. Control unit 146 also determines the frequency of the selected FM channel, determines the fractional value and the integer value for the selected FM channel frequency, provides the fractional value to summer 128, and provides the integer value to summer 132. Control unit 146 also provides various controls to PLL and divider 140 to obtain the desired PLL operating characteristics, as described below.

Within FM receiver 150, a low noise amplifier (LNA) 152 receives and amplifies a received FM signal from antenna 144 and provides an input FM signal to a downconverter 154. A local oscillator (LO) signal generator 148 obtains a receive LO signal at a selected FM frequency from PLL and divider 140, generates inphase (I) and quadrature (Q) LO signals based on the receive LO signal, and provides the I and Q LO signals to downconverter 154. Downconverter 154 downconverts the input FM signal with the I and Q LO signals and provides I and Q downconverted signals. The I and Q downconverted signals are filtered by analog filters 156, buffered by buffers 158, and digitized by analog-to-digital converters (ADCs) 160 to obtain I and Q input samples. The I and Q samples are filtered by digital filters 162 and demodulated by an FM demodulator (Demod) 164 to obtain L+R and L−R audio components. An FM decoder 166 decodes the L+R and L−R audio components and provides a left audio signal (Left_in) and a right audio signal (Right_in).

FIG. 1 shows exemplary designs of FM transmitter 120 and FM receiver 150. FM transmitter 120 may also be implemented with other designs and may include other circuit blocks not shown in FIG. 1. Similarly, FM receiver 150 may be implemented with other designs and may include other circuit blocks not shown in FIG. 1. Portions of FM transmitter 120 and FM receiver 150 may be implemented on an analog integrated circuit (IC), a radio frequency IC (RFIC), a mixed-signal IC, etc. Other portions of FM transmitter 120 and FM receiver 150 may be implemented on a digital IC such as an application specific integrated circuit (ASIC). For example, PLL and divider 140 and PA 142 for FM transmitter 120, LO signal generator 148, and LNA 152 through buffer 158 for FM receiver 150 may be implemented on an RFIC. FM encoder 122 to summer 132 for FM transmitter 120 and ADC 160 to FM decoder 166 may be implemented on an ASIC.

Figure 2:
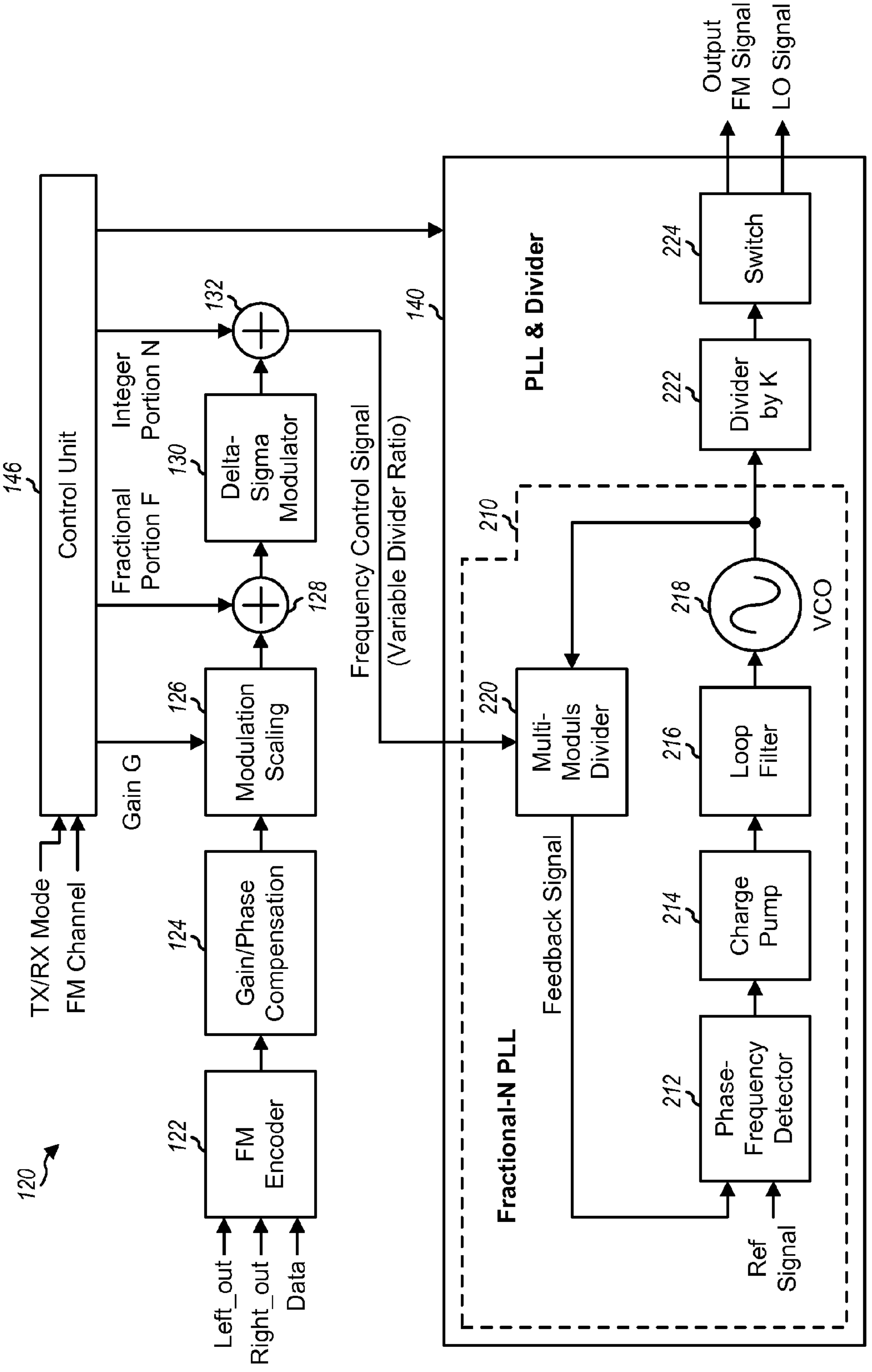
FIG. 2 shows a block diagram of the FM transmitter.

FIG. 2 shows a block diagram of an exemplary design of PLL and divider 140 within FM transmitter 120 in FIG. 1. In this exemplary design, PLL and divider 140 may operate in a transmit mode or a receive mode at any given moment. In the transmit mode, FM transmitter 120 is selected. PLL and divider 140 then perform FM modulation and provide an output FM signal on a selected FM channel. In the receive mode, FM receiver 150 is selected. PLL and divider 140 then provide a receive LO signal for downconversion of an input FM signal on a selected FM channel.

In the exemplary design shown in FIG. 2, PLL and divider 140 include a fractional-N PLL 210, a divider 222, and a switch 224. Within PLL 210, a phase-frequency detector 212 receives a reference (Ref) signal and a feedback signal, compares the phases of the two signals, and provides an error signal that indicates the phase difference/error between the two signals. A charge pump 214 receives the error signal and generates a current signal that is proportional to the detected phase error. A loop filter 216 filters the current signal and provides a control voltage for a VCO 218. Loop filter 216 adjusts the control voltage such that the frequency of VCO 218 is locked to the frequency of the reference signal. VCO 218 generates an oscillator signal having a frequency that is determined by the control voltage from loop filter 216. The oscillator signal is an FM signal in the transmit mode and is an LO signal at a fixed frequency in the receive mode. A multi-modulus divider 220 obtains a variable divider factor from the frequency control signal from summer 132, divides the oscillator signal in frequency by the variable divider factor, and provides the feedback signal.

Divider 222 divides the oscillator signal in frequency by a fixed integer divider ratio K and provides a divided oscillator signal. The divider ratio K may be dependent on the selected FM channel, as described below. Switch 224 provides the divided oscillator signal as an output FM signal to PA 142 when FM transmitter 120 is selected in the transmit mode. Switch 224 provides the divided oscillator signal as the receive LO signal to LO signal generator 148 when FM receiver 150 is selected in the receive mode. Although not shown in FIG. 2, a lowpass filter may receive the output FM signal from switch 224, filter the output FM signal to attenuate harmonics that may interfere with non-FM receivers, and provide a filtered output FM signal to PA 142.

The frequency of the oscillator signal is determined by the frequency of the selected FM channel and may be expressed as:

$$f_{osc}=K\cdot f_{ch}, \quad \text{Eq (1)}$$

where $f_{ch}$ is the selected FM channel frequency, and $f_{osc}$ is the oscillator signal frequency.

The oscillator signal frequency is related to the reference signal frequency, as follows:

$$f_{osc}=Q\cdot f_{ref}, \quad \text{Eq (2)}$$

where $f_{ref}$ is the reference signal frequency, and

Q is the divider ratio of multi-modulus divider 220.

The divider ratio Q of multi-modulus divider 220 may be expressed as:

$$Q=K\cdot\frac{f_{ch}}{f_{ref}}. \quad \text{Eq (3)}$$

As shown in equation (3), the divider ratio Q of multi-modulus divider 220 is dependent on the selected FM channel frequency, the reference signal frequency (which is typically a fixed frequency), and the divider ratio of divider 222 (which is fixed for the selected FM channel). The divider ratio Q may be a non-integer value and may be decomposed into an integer portion N and a fractional portion F, as follows:

$$N=\lfloor Q\rfloor, \text{ and} \quad \text{Eq (4a)}$$

$$F=Q-N, \quad \text{Eq (4b)}$$

where $\lfloor Q\rfloor$ denotes a floor operator that provides the largest integer value that is less than or equal to Q. In general, $1\leqq N$, $0<F<1$ and $Q=N+F$.

Control unit 146 receives information indicative of the selected FM channel. Control unit 146 determines the divider ratio K, the integer portion N, and the fraction portion F based on the selected FM channel. Control unit 146 may store a look-up table having one entry of K, N and F for each FM channel that can be selected. Control unit 146 may then access the look-up table to determine K, N and F for the selected FM channel. Control unit 146 may also determine K, N and F for the selected FM channel in other manners. In any case, control unit 146 provides the divider ratio K to divider 222, the fraction portion F to summer 128, and the integer portion N to summer 132.

In the transmit mode, summer 128 sums the factional portion F from control unit 146 and the scaled FM MPX signal from modulation scaling unit 126 and provides the modulator input signal. Delta-sigma modulator 130 receives the modulator input signal and generates a bit sequence of ones ('1') and zeros ('0'), with the percentage of ones being dependent on the modulator input signal. However, the ones and zeros are distributed in the bit sequence such that most of quantization noise is shaped to appear at high frequency and may be more easily filtered out by loop filter 216. Summer 132 sums the bit sequence from delta-sigma modulator 130 with the integer portion N and provides an instantaneous divider ratio to divider 220. The instantaneous divider ratio may be equal to either N or N+1, depending on whether a zero or a one is provided by delta-sigma modulator 130. The instantaneous divider ratio is thus a variable divider ratio that is dependent on both the selected FM channel and the scaled FM MPX signal.

In the receive mode, summer 128 sums the factional portion F from control unit 146 and a fixed value (e.g., zero) from modulation scaling unit 126 and provides the modulator input signal. Delta-sigma modulator 130 and summer 132 operate as described above and provide an instantaneous divider ratio to divider 220. The instantaneous divider ratio may be equal to either N or N+1 and is a variable divider that is dependent on only the selected FM channel.

PLL 210 performs digital FM modulation in the transmit mode. Digital FM modulation refers to frequency modulation of an oscillator signal to obtain a digital frequency modulated signal, i.e., the output FM signal. The output FM signal has constant amplitude with fixed high and low digital levels, and information is stored in the instantaneous frequency of the output FM signal. The frequency of the oscillator signal may be modulated by varying the divider factor of multi-modulus divider 220 based on the FM MPX signal. The frequency control signal from summer 132 includes the variable divider ratio for divider 220 and hence determines the instantaneous frequency of the FM signal.

PLL 210 operates as a normal PLL without frequency modulation in the receive mode. In the receive mode, the divider factor of multi-modulus divider 220 is determined based only on the selected FM channel, and the oscillator signal frequency is fixed at Q times the selected FM channel frequency.

In both the transmit and receive modes, PLL 210 locks the oscillator signal frequency to the reference signal frequency. Hence, changing the divider ratio of divider 220 changes the frequency of the oscillator signal.

Frequency modulation is accomplished by controlling the divider ratio of divider 220 such that the oscillator signal frequency is modulated by the instantaneous deviations of the FM MPX signal. Frequency modulation is thus achieved via an in-loop frequency modulation scheme that may be viewed as changing the phase of the feedback signal from divider 220. The frequency modulation would then undergo lowpass filtering, which is defined by the closed-loop response of PLL 210. The closed-loop response of PLL 210 may be designed to obtain the desired performance, which may be quantified by phase noise, tracking and acquisition time, etc.

Ideally, the closed-loop response of PLL 210 should have constant gain and linear phase across the entire range of frequency modulation. In practice, the closed-loop response will deviate from the ideal response by some amount. It may be desirable to reduce the impact of the closed-loop response of PLL 210 on the frequency modulation. This may be achieved by keeping the frequency modulation well within a 3 dB closed-loop bandwidth of PLL 210. Equivalently, the closed-loop bandwidth of PLL 210 may be set sufficiently higher than the frequency modulation. Nevertheless, there may be some gain and/or phase distortion of the frequency modulation due to the closed-loop response of PLL 210.

In one exemplary design, the FM MPX signal may be pre-distorted to compensate for gain and/or phase distortion due to the closed-loop response of PLL 210. The L+R audio component in the FM MPX signal resides at low frequency (e.g., from DC to 15 KHz) whereas the L−R audio component in the FM MPX signal resides at higher frequency (e.g., from 23 to 53 KHz). The L+R audio component and the L−R audio component may thus observe different gains and relative phases due to the closed-loop response of PLL 210. The pre-distortion may allow for better recovery of the left and right audio signals from the L+R audio component and the L−R audio component in the FM MPX signal.

In one exemplary design of gain and phase compensation, the closed-loop response of PLL 210 may be determined, e.g., via computer simulation or empirical lab measurements. The amplitude and phase of an equalizer may then be determined based on the closed-loop response of PLL 210 such that the overall response of the equalizer and the PLL is as close to an ideal response as possible. This may be achieved by iteratively varying coefficients of the equalizer and measuring the overall response until (i) the amplitude response is as flat as possible, e.g., from DC to 60 KHz, and (ii) group delay variation is minimized, e.g., from DC to 60 KHz. Gain and phase compensation may thus be achieved for the closed-loop response of PLL 210.

Figure 3:
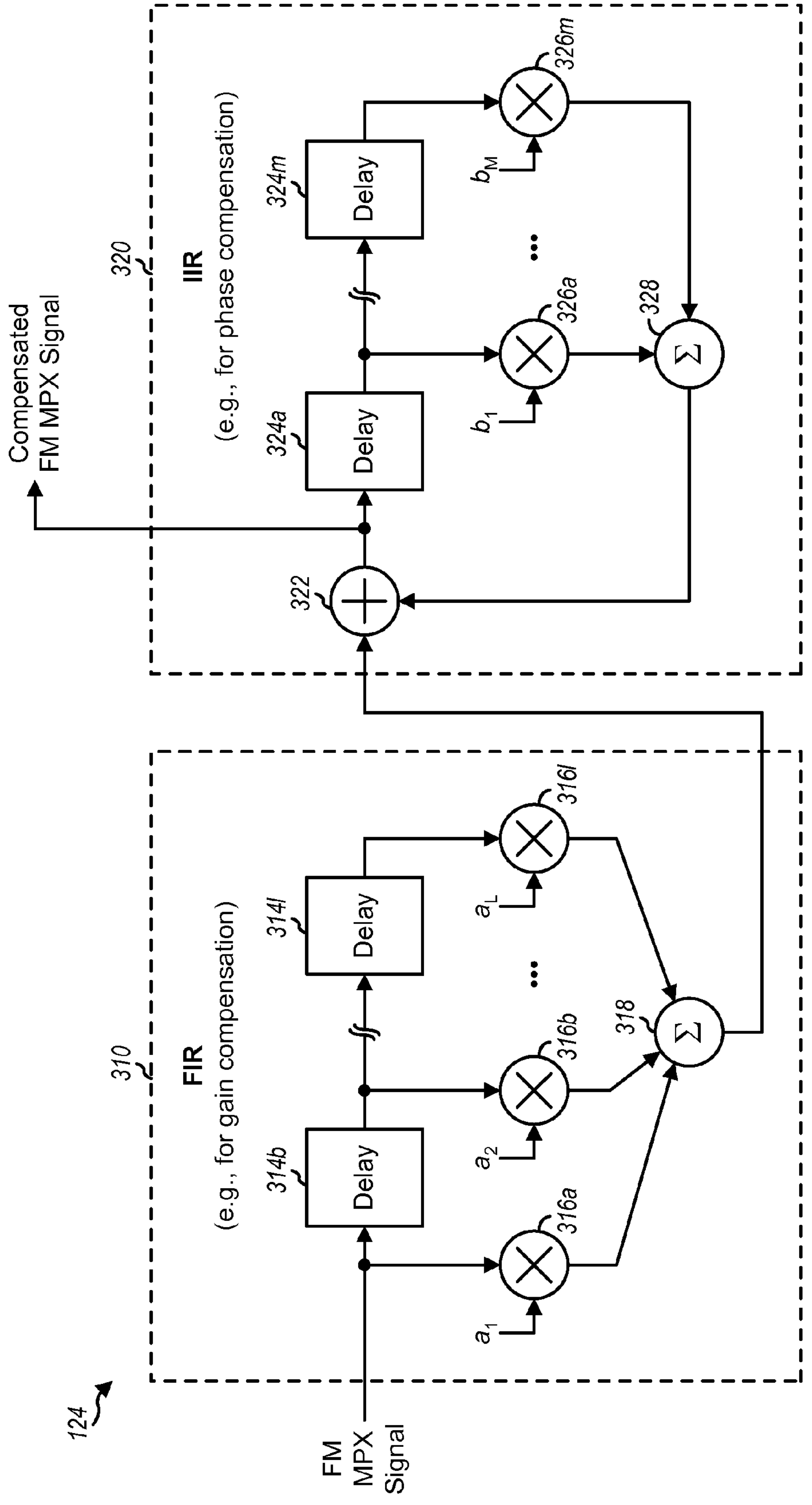
FIG. 3 shows a block diagram of a gain/phase compensation unit.

FIG. 3 shows a block diagram of an exemplary design of gain/phase compensation unit 124 in FIG. 1. In this exemplary design, gain/phase compensation unit 124 is implemented with an equalizer comprising a finite impulse response (FIR) filter 310 and an infinite impulse response (IIR) filter 320. FIR filter 310 performs gain compensation to obtain a flat overall amplitude response for compensation unit 124 and PLL 210. IIR filter 320 performs phase compensation to obtain a flat overall group delay response for compensation unit 124 and PLL 210.

FIR filter 310 includes L taps, where L may be any suitable value. For example, L may be equal to 3, 5, 7, 9, etc. FIR filter 430 includes L−1 delay elements **314*b* through 314*l* that are coupled in series, with delay element 314*b* receiving the FM MPX signal from FM encoder 122 in FIG. 1. Each delay element 314 provides a delay of one sample period. A multiplier 316*a* is coupled to the input of delay element 314*b*, and L−1 multipliers 316*b* through 316*l* are coupled to the outputs of L−1 delay elements 314*b* through 314*l*, respectively. Multipliers 316*a* through 316*l* multiply their inputs with coefficients $a_1$ through $a_L$, respectively. A summer 318 sums the outputs of all L multipliers 316*a* through 316*l*** and provides a filtered FM MPX signal.

IIR filter 320 includes M taps, where M may be any suitable value. For example, M may be equal to 2, 3, etc. Within IIR filter 320, a summer 322 sums the filtered FM MPX signal from FIR filter 310 with the output of a summer 328 and provides the compensated FM MPX signal. M delay elements **324*a* through 324*m* are coupled in series, with delay element 324*a* coupled to the output of summer 322. Each delay element 324 provides a delay of one sample period. M multiplier 326*a* through 326*m* are coupled to the outputs of M delay elements 324*a* through 324*m*, respectively. Multipliers 326*a* through 326*m* multiply their inputs with coefficients $b_1$ through $b_M$, respectively. Summer 328 sums the outputs of all M multipliers 326***a* through 326*m* and provides its output to summer 322.

FIG. 3 shows an exemplary design of gain/phase compensation unit 124 comprising FIR filter 310 and IIR filter 320. In general, compensation unit 124 may be implemented with any type of digital filter and any combination of digital filters that can compensate the effects of the closed-loop response of PLL 210.

In one exemplary design, PLL 210 may operate at high frequency, which may be much higher than FM frequency. For example, the FM frequency may be within a range of 87.5 to 108.0 megahertz (MHz), and PLL 210 may operate at over one gigahertz (GHz). The higher operating frequency of PLL 210 may provide certain advantages such as better phase noise and smaller circuit components (e.g., smaller capacitors, inductors, etc.) for oscillator 218 and other circuit blocks within PLL 210.

In one exemplary design, different divider ratios may be used for divider 222 for different FM channels. For example, VCO 218 may operate near 3.0 GHz, a divider ratio of K=28 may be used for an FM channel near 108 MHz, a divider ratio of K=32 may be used for an FM channel near 95 MHz, a divider ratio of K=34 may be used for an FM channel near 88 MHz, etc. In general, the divider ratio K for divider 222 may range from $K_{max}$ for the lowest FM channel to $K_{min}$ for the highest FM channel. $K_{max}$ and $K_{min}$ may be determined by the nominal frequency of VCO 218 and the FM frequency range. The divider ratio K may be dependent on the nominal frequency for VCO 218 and the selected FM channel. The use of different divider ratios for different FM channels may reduce the tuning range requirements of VCO 218, which may be desirable.

The gains of various circuit blocks within FM transmitter 120 may be set to obtain a target frequency deviation for the FM signal from PLL 210. Frequency deviation is the difference between the highest and lowest frequency of the FM signal. The divider ratio K for divider 222 may be changed for different FM channels, as described above. Different divider ratios K would result in different center frequencies for the FM signal as well as different frequency deviations for the FM signal.

For example, the lowest divider ratio $K_{min}$ may be used for the highest FM channel, and the target frequency deviation $\Delta f_{target}$ may be obtained for the FM signal on the highest FM channel. If divider ratio K is used for a selected FM channel, then the frequency deviation for the FM signal on the selected FM channel may be expressed as:

$$\Delta f_K = \Delta f_{target} \cdot \frac{K_{min}}{K}, \qquad \text{Eq (5)}$$

where $\Delta f_K$ is the frequency deviation for the FM signal on the selected FM channel. For example, $\Delta f_{target}$ may be equal to 75 KHz for $K_{min}$=28, and $\Delta f_K$ may be equal to 65.6 KHz for K=32.

Figure 4:
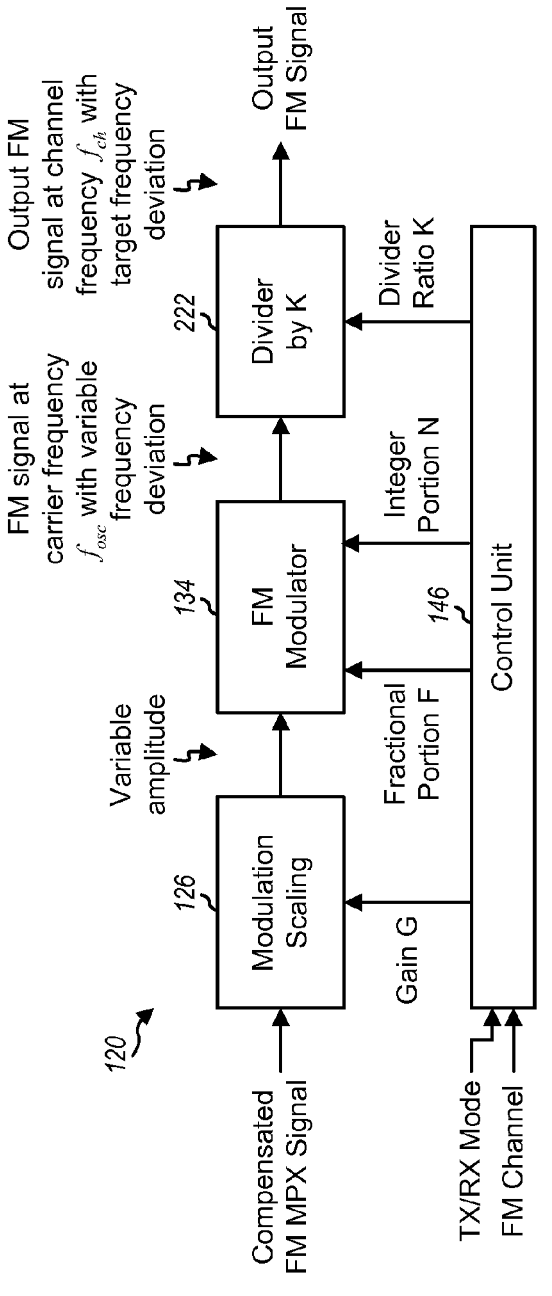
FIG. 4 shows a block diagram of a portion of the FM transmitter.

FIG. 4 shows a block diagram of a portion of FM transmitter 120 in FIGS. 1 and 2. FM transmitter 120 can vary the modulation scaling to compensate for use of different divider ratios K in generating the output FM signal. As shown in FIG. 4, FM transmitter 120 includes modulation scaling unit 126, an FM modulator 134, and divider 222. FM modulator 134 includes delta-sigma modulator 130 and PLL 210 in FIG. 2.

Modulation scaling unit 126 receives the compensated FM MPX signal from gain/phase compensation unit 124 and the gain G from control unit 146. The gain may be dependent on the divider ratio K, which may in turn be dependent on the selected FM channel. In one exemplary design, the gain G may be determined as follows:

$$G = \frac{K}{K_{ref}}, \qquad \text{Eq (6)}$$

where $K_{ref}$ is a divider ratio that provides the target frequency deviation with G=1. If $K_{ref}=K_{min}$ then $G=K/K_{min}$. For the example above with $K_{min}$=28, the gain would be G=1.423 for K=32.

The compensated FM MPX signal may have constant amplitude. Modulation scaling unit 126 scales the amplitude of the compensated FM MPX signal with the gain G and provides the scaled FM MPX signal having variable amplitude. FM modulator 134 frequency modulates the oscillator signal with the scaled FM MPX signal and provides the FM signal. The FM signal is centered at the oscillator signal frequency $f_{osc}$ and has variable frequency deviation, which is determined by the variable amplitude of the scaled FM MPX signal. Divider 222 divides the FM signal in frequency by the divider ratio K and provides the output FM signal. The output FM signal is centered at the selected FM channel frequency $f_{ch}$ and has the target frequency deviation.

Figure 5:
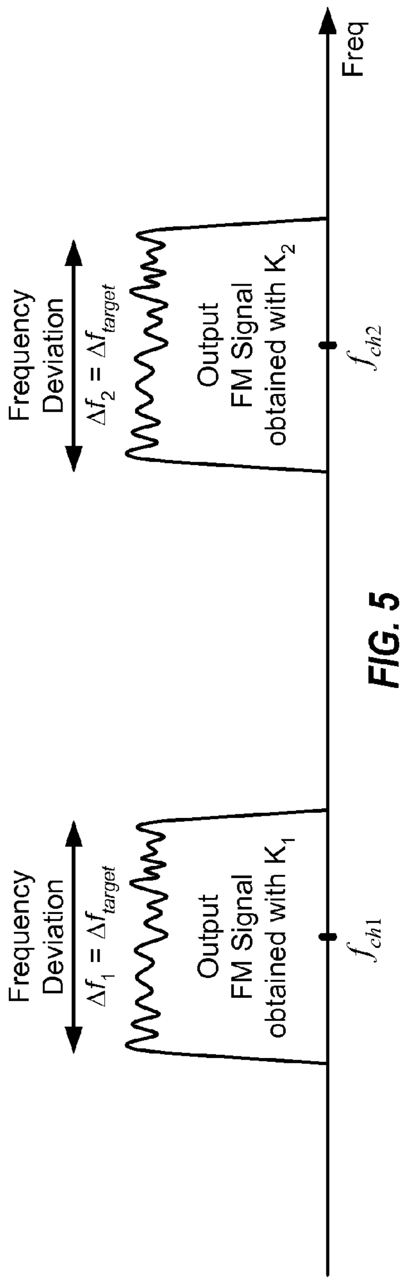
FIG. 5 shows output FM signals for two FM channels.

FIG. 5 shows output FM signals for two FM channels 1 and 2. The output FM signal for FM channel 1 is centered at frequency $f_{ch1}$, has frequency deviation of $\Delta f_1=\Delta f_{target}$, and is obtained with divider ratio $K_1$. The output FM signal for FM channel 2 is centered at frequency $f_{ch2}$, has frequency deviation of $\Delta f_2=\Delta f_{target}$, and is obtained with divider ratio $K_2$. The scaling by modulation scaling unit 126 allows the output FM signals for different FM channels to have the target frequency deviation even with the use of different divider ratios K for divider 222.

Figure 6:
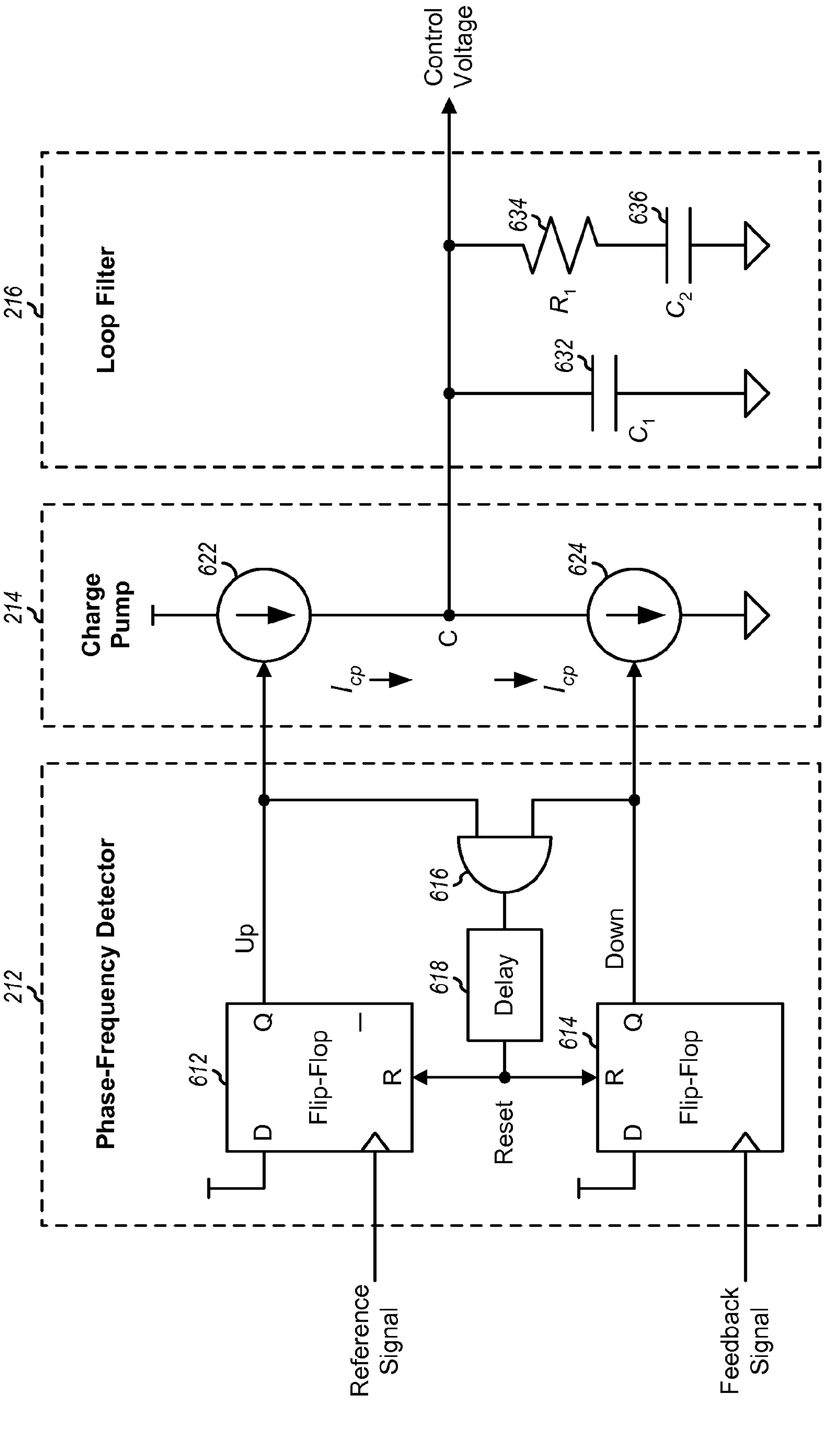
FIG. 6 shows a schematic diagram of a phase-frequency detector, a charge pump, and a loop filter within a PLL.

FIG. 6 shows a schematic diagram of an exemplary design of phase-frequency detector 212, charge pump 214, and loop filter 216 within PLL 210 in FIG. 2. Within phase frequency detector 212, the reference signal and the feedback signal are provided to the clock inputs of D flip-flops 612 and 614, respectively. The data (D) inputs of flip-flops 612 and 614 are coupled to a power supply and receive logic high. The data (Q) output of flip-flop 612 is indicative of the reference signal being early with respect to the feedback signal. The Q output of flip-flop 614 is indicative of the reference signal being late with respect to the feedback signal. An AND gate 616 receives the Q outputs of flip-flops 612 and 614 and performs logical AND on the two signals. A delay unit 618 delays the output of AND gate 616 by a small amount and provides a reset signal to the reset (R) inputs of flip-flops 612 and 614. The Q output of flip-flop 612 provides an Up signal, and the Q output of flip-flop 614 provides a Down signal.

Within charge pump 214, a current source 622 is coupled between the power supply and node C, and a current source 624 is coupled between node C and circuit ground. Current source 622 receives the Up signal from flip-flop 612 and provides a current of $I_{cp}$ to loop filter 216 when the Up signal is enabled. Current source 624 receives the Down signal from flip-flop 614 and sinks a current of $I_{cp}$ from loop filter 216 when the Down signal is enabled.

Unit 618 provides a short delay to combat a dead zone in charge pump 214. Current sources 622 and 624 need some amount of time to turn on and off. This transition time is referred to as the dead zone since, during the transition time, phase information in the Up and Down signals is lost. The short delay combats the dead zone.

Within loop filter 216, a capacitor 632 is coupled between node C and circuit ground. A resistor 634 and a capacitor 636 are coupled in series, and the combination is coupled between node C and circuit ground. Loop filter 216 implements a second-order loop. The values of capacitors 632 and 636 and resistor 634 may be selected to obtain the desired closed-loop bandwidth for PLL 210. Node C provides the control voltage for VCO 218.

Figure 7:
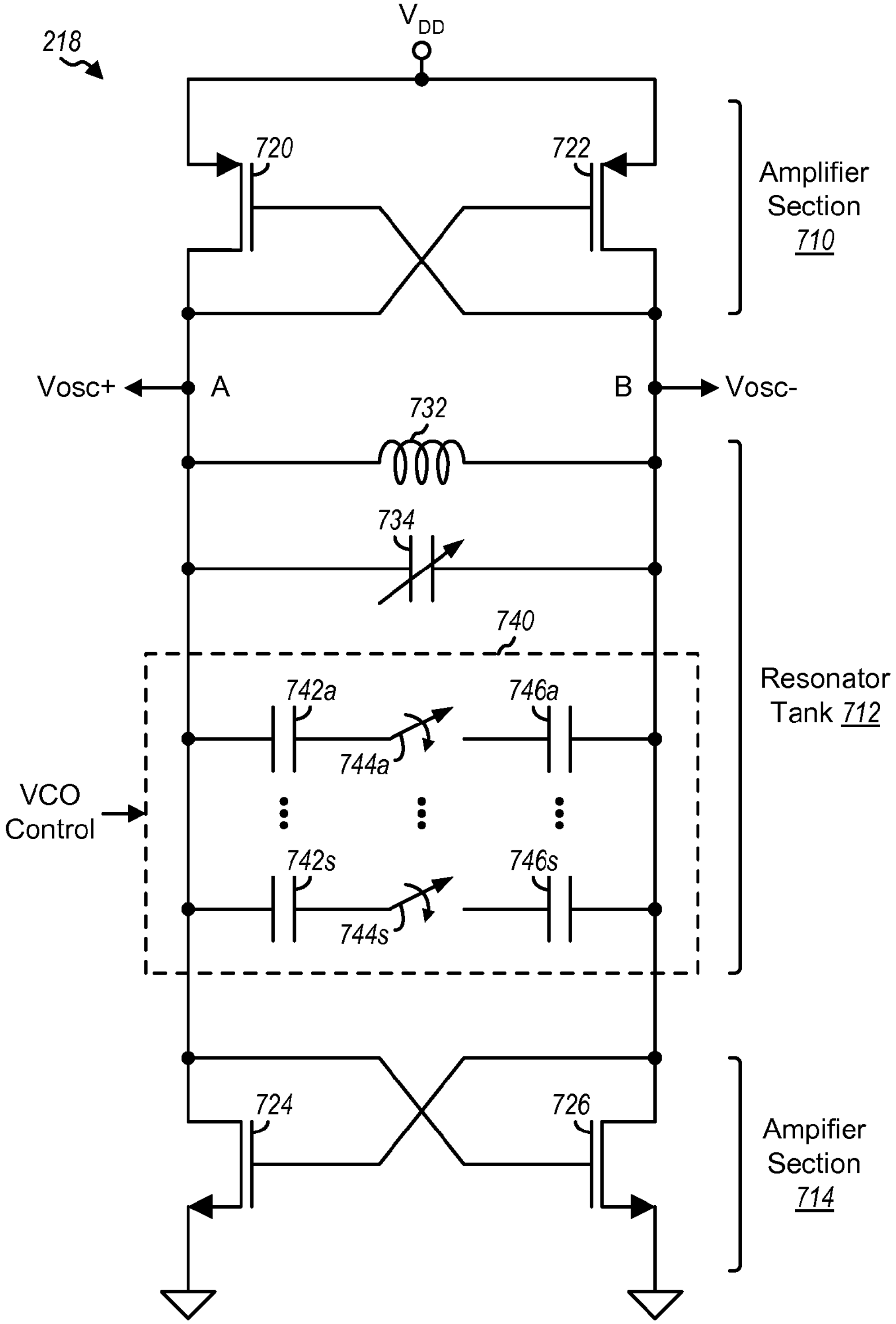
FIG. 7 shows a schematic diagram of a VCO.

FIG. 7 shows a schematic diagram of an exemplary design of VCO 218 in FIG. 2. VCO 218 includes amplifier sections 710 and 714 and a resonator tank 712. Amplifier section 710 includes P-channel metal oxide semiconductor (PMOS) transistors 720 and 722 having their sources coupled to the power supply, their drains coupled to nodes A and B, respectively, and their gates coupled to nodes B and A, respectively. Amplifier section 714 includes N-channel metal oxide semiconductor (NMOS) transistors 724 and 726 having their sources coupled to the circuit ground, their drains coupled to nodes A and B, respectively, and their gates coupled to nodes B and A, respectively. Transistors 720 and 724 form a first inverter, and transistors 722 and 726 form a second inverter. Nodes A and B provide a differential oscillator signal comprising the Vosc+ and Vosc− signals, respectively.

Resonator tank 712 includes an inductor 732, a varactor 734, and a tuning section 740, all of which are coupled in parallel and between nodes A and B. Varactor 734 may be adjusted to obtain the desired oscillation frequency for VCO 218. In the exemplary design shown in FIG. 7, tuning section 740 includes S tuning branches, where S may be any integer value. Each tuning branch includes a capacitor 742, a switch 744, and a capacitor 746 coupled in series, the combination of which is coupled between nodes A and B. The S tuning branches may include capacitors of equal size for thermometer decoding or capacitors of different sizes for binary decoding. Each tuning branch may be enabled by closing switch 744 for that branch or disabled by opening switch 744. Each tuning branch that is enabled lowers the oscillation frequency of VCO 218. The S tuning branches may be selectively enabled based on a VCO control to obtain different oscillation frequencies, different tuning ranges, different VCO gain (Kvco), etc. The VCO control may be provided by control unit 146.

In one exemplary design, PLL 210 may have different characteristics for the transmit mode and the receive mode. For example, the closed-loop bandwidth of PLL 210 may be different for the transmit and receive modes. The closed-loop bandwidth for the transmit mode may be wider than the closed-loop bandwidth for the receive mode in order to reduce gain and phase variations of the closed-loop PLL transfer function in the transmit mode. This may allow PLL 210 to meet FM stereo channel separation requirements. A more narrow closed-loop bandwidth may be used for the receive mode in order to reduce far-out phase noise. This may allow PLL 210 to meet FM selectivity requirements in the presence of adjacent and alternate channel interferers.

The loop characteristics of PLL 210 may be varied by changing various components within PLL 210. For example, the loop characteristics may be varied by changing the amount of current $I_{cp}$ within charge pump 214 in FIG. 6, by changing the values of capacitors 632 and 636 and/or the value of resistor 634 within loop filter 216, by enabling different tuning branches within VCO 218, etc. In one exemplary design, certain circuit components within PLL 210 may be made programmable so that the desired loop characteristics can be obtained for each of the transmit and receive modes. Tuning section 740 within VCO 218 in FIG. 7 may be used to obtain programmable VCO gain, which may allow the capacitors within loop filter 216 and the current $I_{cp}$ for charge pump 214 to be maintained within reasonable range when switching between the transmit and receive modes.

The exemplary designs of FM transmitter 120 and FM receiver 150 in FIGS. 1 and 2 may provide various advantages. First, frequency modulation for FM transmitter 120 is achieved by varying the divider ratio of multi-modulus divider 220 within PLL 210 using delta-sigma modulator 130. This frequency modulation scheme avoids the use of a digital-to-analog converter (DAC) to convert the FM MPX signal from digital to analog. Furthermore, lower power consumption may be achieved due to direct upconversion via PLL 210. Second, the same PLL 210 used for FM transmitter 120 can be shared for FM receiver 150. The specifications for the transmit and receive modes may be different. Hence, certain components within PLL 210 may be made programmable to enable sharing of PLL 210 for both the transmit and receive modes. Various features (e.g., gain/phase compensation, modulation scaling, etc.) are also described above to improve performance and/or simplify circuit design.

In an exemplary design, an apparatus may comprise a delta-sigma modulator and a PLL for an FM transmitter. The delta-sigma modulator may receive a modulating signal and provide a modulator output signal. The modulating signal may comprise an FM MPX signal having an L+R audio component and an L−R audio component. The modulating signal may also comprise other types of signals. The PLL may perform frequency modulation based on the modulator output signal and provide an FM signal.

The apparatus may further comprise first and second summers. The first summer (e.g., summer 128 in FIGS. 1 and 2) may sum an input signal (e.g., a compensated FM MPX signal) and a fractional value for a selected FM channel and may provide the modulating signal to the delta-sigma modulator. The second summer (e.g., summer 132) may sum the modulator output signal with an integer value for the selected FM channel and may provide a frequency control signal to the PLL. The PLL may provide the FM signal on the selected FM channel.

In one exemplary design, the apparatus may comprise a gain/phase compensation unit to compensate the modulating signal for the closed-loop response of the PLL. The gain/phase compensation unit may comprise a FIR filter (e.g., FIR filter 310 in FIG. 3) to provide gain compensation for the modulating signal. Alternatively or additionally, the gain/phase compensation unit may comprise an IIR filter (e.g., IIR filter 320 in FIG. 3) to provide phase compensation for the modulating signal. The gain/phase compensation may improve performance and may comprise other types of filters.

In one exemplary design, the apparatus may comprise a divider (e.g., divider 222 in FIGS. 2 and 4) to divide the FM signal in frequency based on a fixed divider ratio K and provide an output FM signal. A control unit may provide the divider ratio K based on the selected FM channel for the FM signal. The apparatus may further comprise a scaling unit (e.g., modulation scaling unit 126 in FIGS. 1 and 2) to scale the amplitude of the modulating signal based on a gain to obtain a target frequency deviation for the FM signal. The gain may be determined based on the divider ratio K, e.g., as shown in equation (6).

In one exemplary design, the PLL may comprise a VCO, a multi-modulus divider, a phase-frequency detector, a charge pump, and a loop filter, e.g., as shown in FIG. 2. The VCO may receive a control signal and provide an oscillator signal as the FM signal. The multi-modulus divider may divide the oscillator signal in frequency by a variable divider ratio to achieve frequency modulation and provide a feedback signal. The variable divider ratio may be determined based on the modulator output signal. The phase-frequency detector may receive a reference signal and the feedback signal and provide an error signal. The charge pump may receive the error signal and provide a current signal. The loop filter may filter the current signal and provide the control signal for the VCO.

In one exemplary design, the PLL may be operable in a transmit mode or a receive mode. The PLL may perform frequency modulation based on the modulator output signal and may provide the FM signal in the transmit mode. The PLL may provide an LO signal at a fixed frequency in the receive mode. In one exemplary design, the PLL may comprise at least one component having different programmable values for the transmit mode and the receive mode. For example, the PLL may comprise a programmable current for the charge pump, a programmable capacitor for the loop filter, a programmable resistor for the loop filter, a programmable VCO gain for the VCO, and/or other programmable components.

In one exemplary design, the apparatus may comprise an LO signal generator and a downconverter for an FM receiver. The LO signal generator may receive the oscillator signal from the PLL and provide I and Q LO signals. The downconverter may receive and downconvert an input FM signal with the I and Q LO signals and provide I and Q downconverted signals. The apparatus may further comprise an FM demodulator and an FM decoder. The FM demodulator may receive I and Q samples obtained from the I and Q downconverted signals, respectively, and provide an FM MPX signal. The FM decoder may process the FM MPX signal and provide left and right audio signals.

Figure 8:
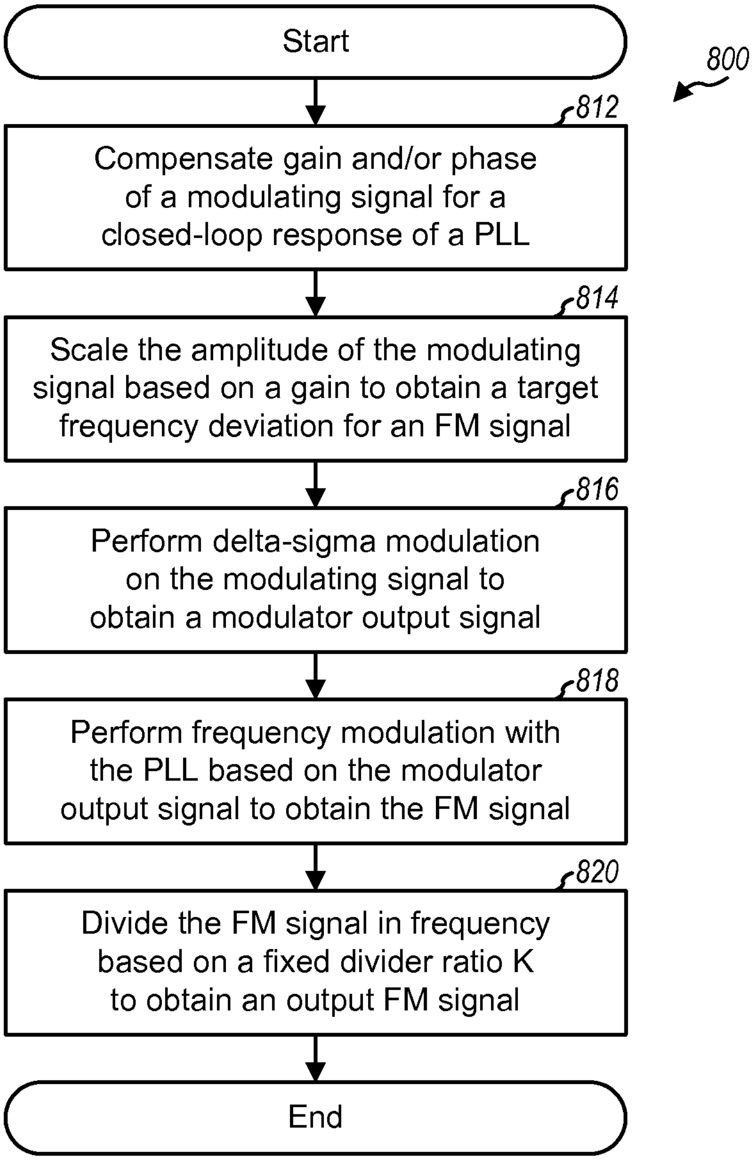
FIG. 8 shows a process for generating an FM signal.

FIG. 8 shows an exemplary design of a process 800 for generating an FM signal. In an exemplary design, the gain and/or phase of a modulating signal may be compensated for a closed-loop response of a PLL (block 812). The gain and/or phase compensation may be based on a FIR filter, an IIR filter, etc. The amplitude of the modulating signal may be scaled based on a gain to obtain a target frequency deviation for the FM signal (block 814). The gain may be determined based on a fixed divider ratio K for a selected FM channel.

Delta-sigma modulation may be performed on the modulating signal to obtain a modulator output signal (block 816). Frequency modulation (FM) may be performed with the PLL based on the modulator output signal to obtain the FM signal (block 818). In an exemplary design, the FM signal may be divided in frequency based on the fixed divider ratio K to obtain an output FM signal (block 820). The divider ratio K may be determined based on the selected FM channel for the FM signal.

In one exemplary design of block 818, an oscillator signal may be generated based on a control signal and may be provided as the FM signal. The oscillator signal may be divided in frequency by a variable divider ratio Q to obtain a feedback signal. The variable divider ratio Q may be determined based on the modulator output signal. An error signal may be generated based on a reference signal and the feedback signal. The error signal may be filtered to obtain the control signal.

In one exemplary design, at least one programmable component within the PLL may be varied based on whether a transmit mode or a received mode is selected for the PLL. The at least one programmable component may comprise a programmable current for a charge pump, a programmable capacitor for a loop filter, a programmable resistor for the loop filter, a programmable VCO gain for a VCO, etc.

The FM transmitter and FM receiver described herein may be implemented on an IC, an analog IC, an RFIC, a mixed-signal IC, an ASIC, a printed circuit board (PCB), an electronics device, etc. The FM transmitter and FM receiver may also be fabricated with various IC process technologies such as complementary metal oxide semiconductor (CMOS), NMOS, PMOS, bipolar junction transistor (BJT), bipolar-CMOS (BiCMOS), silicon germanium (SiGe), gallium arsenide (GaAs), etc.

An apparatus implementing the FM transmitter and/or FM receiver described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:

a scaling unit operative to scale a signal based on a gain corresponding to a target frequency deviation;

a delta-sigma modulator responsive to the scaling unit and operative to receive a modulating signal and to provide a modulator output signal;

a phase-locked loop (PLL) operative to perform frequency modulation (FM) based on the modulator output signal to generate an FM signal; and a divider operative to divide the FM signal in frequency based on a divider ratio to generate an output FM signal, wherein the FM signal has a frequency deviation within the target frequency deviation, and wherein the gain is determined based on the divider ratio.

2. The apparatus of claim 1, wherein the modulating signal comprises an FM stereo multiplex (MPX) signal having a left plus right (L+R) audio component and a left minus right (L−R) audio component.

3. The apparatus of claim 1, further comprising:

a first summer operative to sum the scaled signal and a fractional value for a selected FM channel to generate the modulating signal and to provide the modulating signal to the delta-sigma modulator; and a second summer operative to sum the modulator output signal with an integer value for the selected FM channel and provide a frequency control signal to the PLL, and wherein the PLL is operative to provide the FM signal on the selected FM channel.

4. The apparatus of claim 1, wherein the PLL comprises a multi-modulus divider operative to divide the FM signal in frequency by a variable divider ratio to achieve frequency modulation, the variable divider ratio being determined based on the modulator output signal.

5. The apparatus of claim 1, further comprising: a gain/phase compensation unit operative to compensate the modulating signal for a closed-loop response of the PLL.

6. The apparatus of claim 5, wherein the gain/phase compensation unit comprises a finite impulse response (FIR) filter providing gain compensation for the modulating signal.

7. The apparatus of claim 5, wherein the gain/phase compensation unit comprises an infinite impulse response (IIR) filter providing phase compensation for the modulating signal.

8. The apparatus of claim 1, wherein the divider ratio is an integer value greater than one.

9. The apparatus of claim 1, further comprising: a control unit operative to determine the divider ratio based on a selected FM channel for the FM signal.

10. The apparatus of claim 1, wherein the scaling unit is further operative to scale an amplitude of the signal based on the gain to enable the FM signal to have the target frequency deviation.

11. The apparatus of claim 1, wherein the PLL is operable in a transmit mode or a receive mode, the PLL performing frequency modulation based on the modulator output signal and providing the FM signal in the transmit mode, the PLL providing a local oscillator (LO) signal at a fixed frequency in the receive mode.

12. The apparatus of claim 1, wherein the PLL comprises a voltage-controlled oscillator (VCO) operative to receive a control signal and provide an oscillator signal as the FM signal;

a multi-modulus divider operative to divide the oscillator signal in frequency by a variable divider ratio and provide a feedback signal, the variable divider ratio being determined based on the modulator output signal, a phase-frequency detector operative to receive a reference signal and the feedback signal and provide an error signal, a charge pump operative to receive the error signal and provide a current signal, and a loop filter operative to filter the current signal and provide the control signal for the VCO.

13. The apparatus of claim 1, wherein the PLL is operable in a transmit mode or a receive mode, and wherein the PLL comprises at least one component having different programmable values for the transmit mode and the receive mode.

14. The apparatus of claim 12, wherein the PLL comprises at least one of a programmable current for the charge pump, a programmable capacitor for the loop filter, a programmable resistor for the loop filter, and a programmable VCO gain for the VCO.

15. The apparatus of claim 1, further comprising:

a local oscillator (LO) signal generator operative to receive an LO signal from the PLL and provide inphase (I) and quadrature (Q) LO signals; and a downconverter operative to receive and downconvert an input FM signal with the I and Q LO signals and provide I and Q downconverted signals.

16. The apparatus of claim 15, further comprising:

an FM demodulator operative to receive I and Q samples obtained from the I and Q downconverted signals, respectively, and provide an FM stereo multiplex (MPX) signal; and an FM decoder operative to process the FM MPX signal and provide left and right audio signals.

17. The apparatus of claim 15, further comprising: a low noise amplifier (LNA) operative to amplify a received FM signal from an antenna and provide the input FM signal.

18. The apparatus of claim 1, further comprising: a control unit operative to receive an indication of a transmit mode or a receive mode being selected for the PLL and to generate at least one control to vary at least one programmable component within the PLL.

19. The apparatus of claim 1, further comprising:

a power amplifier (PA) operative to amplify the FM signal and to provide a transmit FM signal; and an antenna operative to radiate the transmit FM signal.

20. A method comprising:

scaling a signal based on a gain corresponding to a target frequency deviation;

performing delta-sigma modulation on a modulating signal to obtain a modulator output signal based on the scaled signal;

performing frequency modulation (FM) using a phase-locked loop (PLL) based on the modulator output signal to generate an FM signal; and dividing the FM signal in frequency based on a divider ratio to generate an output FM signal, wherein the FM signal has a frequency deviation within the target frequency deviation, and wherein the gain is determined based on the divider ratio.

21. The method of claim 20, further comprising compensating gain and phase of the modulating signal for a closed-loop response of the PLL.

22. The method of claim 20, wherein the divider ratio is an integer value greater than one, and further comprising determining the divider ratio based on a selected FM channel associated with the FM signal.

23. The method of claim 20, wherein scaling the signal comprises scaling an amplitude of the signal based on the gain to enable the FM signal to have the target frequency deviation, and further comprising determining the gain based on the divider ratio.

24. The method of claim 20, further comprising: varying at least one programmable component within the PLL based on whether a transmit mode or a received mode is selected for the PLL, the at least one programmable component comprising at least one of a programmable current for a charge pump, a programmable capacitor for a loop filter, a programmable resistor for the loop filter, and a programmable voltage-controlled oscillator (VCO) gain for a VCO.

25. The method of claim 20, wherein performing the frequency modulation comprises:

generating an oscillator signal based on a control signal, the oscillator signal being provided as the FM signal, dividing the oscillator signal in frequency by a variable divider ratio to obtain a feedback signal, the variable divider ratio being determined based on the modulator output signal, generating an error signal based on a reference signal and the feedback signal, and filtering the error signal to obtain the control signal.

26. An apparatus comprising:

means for scaling a signal based on a gain corresponding to a target frequency deviation;

means for performing delta-sigma modulation on a modulating signal to obtain a modulator output signal based on the scaled signal;

means for performing frequency modulation (FM) based on the modulator output signal to generate an FM signal; and means for dividing the FM signal in frequency based on a divider ratio to obtain an output FM signal, wherein the FM signal has a frequency deviation within the target frequency deviation, and wherein the gain is determined based on the divider ratio.

27. The apparatus of claim 26, further comprising: means for compensating gain and phase of the modulating signal.

28. The apparatus of claim 26, wherein the divider ratio is an integer value greater than one, and further comprising means for determining the divider ratio based on a selected FM channel associated with the FM signal.

29. The apparatus of claim 26, wherein an amplitude of the modulating signal is scaled based on the gain to enable the FM signal to have the target frequency deviation, and further comprising means for determining the gain based on the divider ratio.

30. The apparatus of claim 26, wherein the means for performing frequency modulation comprises at least one programmable component, and further comprising: means for varying the at least one programmable component based on whether a transmit mode or a received mode is selected, the at least one programmable component comprising at least one of a programmable current for a charge pump, a programmable capacitor for a loop filter, a programmable resistor for the loop filter, and a programmable voltage-controlled oscillator (VCO) gain for a VCO.

31. The apparatus of claim 26, wherein the means for performing frequency modulation comprises:

means for generating an oscillator signal based on a control signal, the oscillator signal being provided as the FM signal, means for dividing the oscillator signal in frequency by a variable divider ratio to obtain a feedback signal, the variable divider ratio being determined based on the modulator output signal, means for generating an error signal based on a reference signal and the feedback signal, and means for filtering the error signal to obtain the control signal.

32. A non-transitory computer-readable medium comprising instructions executable by a processor to:

scale a signal based on a gain corresponding to a target frequency deviation;

perform delta-sigma modulation on a modulating signal to obtain a modulator output signal based on the scaled signal;

perform frequency modulation (FM) using a phase-locked loop (PLL) based on the modulator output signal to obtain an FM signal; and divide the FM signal in frequency based on a divider ratio to obtain an output FM signal, wherein the FM signal has a frequency deviation within the target frequency deviation, and wherein the gain is determined based on the divider ratio.

33. An apparatus comprising:

a first summer operative to sum a first signal and a fractional value associated with a selected FM channel to generate a second signal;

a delta-sigma modulator responsive to the first summer and operative to generate a third signal based on the second signal;

a second summer responsive to the delta-sigma modulator and operative to sum the third signal and an integer value associated with the selected FM channel to generate a fourth signal;

a phase-locked loop (PLL) responsive to the second summer and operative to perform frequency modulation (FM) based on the fourth signal and further based on the selected FM channel to generate a fifth signal;

a scaling unit operative to generate the first signal by scaling an amplitude of a signal based on a gain corresponding to a target frequency deviation associated with the fifth signal; and a divider operative to divide the fifth signal in frequency based on a divider ratio to generate a sixth signal, wherein the gain is determined based on the divider ratio.

34. The apparatus of claim 33, wherein the divider ratio is an integer greater than one.

35. The apparatus of claim 33, further comprising a control unit operative to determine the divider ratio based on the selected FM channel.

36. The apparatus of claim 33, wherein the scaling unit is further operative to generate the first signal by scaling an amplitude of the signal.

* * * * *